United States Patent
Brzozowski et al.

(10) Patent No.: US 10,498,439 B2
(45) Date of Patent: Dec. 3, 2019

(54) METHOD AND DEVICE FOR DETERMINING THE LATENCY OR LENGTH OF AN OPTICAL PATH, ESPECIALLY AN OPTICAL FIBER, OF A FIBER-OPTIC TRANSMISSION LINK

(71) Applicant: ADVA Optical Networking SE, Meiningen (DE)

(72) Inventors: Pawel Brzozowski, Atlanta, GA (US); Andreas Färbert, Munich (DE); Maciej Lipski, Gdynia (PL)

(73) Assignee: ADVA Optical Networking SE, Meiningen (DE)

( * ) Notice: Subject to any disclaimer, the term of this patent is extended or adjusted under 35 U.S.C. 154(b) by 0 days.

(21) Appl. No.: 15/992,541

(22) Filed: May 30, 2018

(65) Prior Publication Data
US 2018/0359027 A1    Dec. 13, 2018

(30) Foreign Application Priority Data

Jun. 9, 2017 (EP) .................................. 17175251

(51) Int. Cl.
| | |
|---|---|
| *H04B 10/25* | (2013.01) |
| *H04B 10/077* | (2013.01) |
| *H04B 10/40* | (2013.01) |
| *H04J 14/02* | (2006.01) |
| *H04Q 11/00* | (2006.01) |

(52) U.S. Cl.
CPC ..... *H04B 10/0775* (2013.01); *H04B 10/0773* (2013.01); *H04B 10/25* (2013.01); *H04B 10/40* (2013.01); *H04J 14/02* (2013.01); *H04Q 2011/0073* (2013.01)

(58) Field of Classification Search
CPC .... H04B 10/0775; H04B 10/25; H04B 10/40; H04J 14/02
See application file for complete search history.

(56) References Cited

U.S. PATENT DOCUMENTS

| | | | |
|---|---|---|---|
| 2008/0240077 A1 | 10/2008 | Freiberger | |
| 2009/0097014 A1* | 4/2009 | Piciaccia | G01B 11/02 356/73.1 |
| 2011/0318004 A1 | 12/2011 | Bruno | |
| 2013/0202291 A1* | 8/2013 | Cavaliere | H04B 10/07 398/33 |
| 2014/0177657 A1 | 6/2014 | Bowcutt et al. | |

(Continued)

FOREIGN PATENT DOCUMENTS

| | | |
|---|---|---|
| WO | 2010072425 A1 | 7/2010 |
| WO | 2012048975 A1 | 4/2012 |
| WO | 2012161581 A1 | 11/2012 |

*Primary Examiner* — Dzung D Tran
(74) *Attorney, Agent, or Firm* — The Webb Law Firm

(57) ABSTRACT

A method for determining the latency or length of an optical path of a fiber-optic transmission link includes: starting a measurement cycle at a first point in time; stopping the measurement cycle at a second point in time after having received a last measurement bit or bit pattern at the first end; determining, at the first end, the total round-trip delay of the optical path by evaluating a time information available at the first end; and calculating the length of the optical path by using the total round-trip delay and the group velocity characterizing the signal propagation along the optical path.

20 Claims, 5 Drawing Sheets

(56) References Cited

U.S. PATENT DOCUMENTS

| | | |
|---|---|---|
| 2014/0199072 A1 | 7/2014 | Nuijts et al. |
| 2015/0104167 A1* | 4/2015 | Bottari ............... H04B 10/0775 398/16 |
| 2015/0117861 A1* | 4/2015 | Ponzini .............. H04B 10/2575 398/79 |
| 2016/0134364 A1* | 5/2016 | Grobe ................. H04B 10/071 398/25 |

* cited by examiner

METHOD AND DEVICE FOR DETERMINING THE LATENCY OR LENGTH OF AN OPTICAL PATH, ESPECIALLY AN OPTICAL FIBER, OF A FIBER-OPTIC TRANSMISSION LINK

CROSS-REFERENCE TO RELATED APPLICATION

This application claims priority to European Patent Application No. 17 175 251.2 filed Jun. 9, 2017, the disclosure of which is hereby incorporated in its entirety by reference.

BACKGROUND OF THE INVENTION

Field of the Invention

The invention relates to a method and a device for determining the latency or length of an optical path, especially an optical fiber, of a fiber-optical transmission link. Further, the invention relates to an optical transmission link comprising two optical nodes that are connected via an optical path, wherein the optical nodes comprise a respective device for determining the length of the optical path therebetween. Finally, the invention relates to a method for routing signals in an optical network and a network implementing this method, wherein the latencies between two network nodes are used in order to determine a route which fulfills a given latency constraint.

Description of Related Art

The signal travel time is one of the major routine parameters in case of dynamically switched optical networks. Knowing the "fastest" path through a network improves the signal latency, i.e. the time interval between transmitting a signal at a first point or node of the networks and receiving the signal at a second point or network nodes including the signal delay due to signal switching (and other signal processing operations) and the mere signal propagation time, which, in an optical network, is mainly influenced by the length of the respective total optical path. The total optical path may of course consist of a plurality of partial optical paths or links. Although the invention is applicable to any type of optical path, in most practical applications the optical path or partial optical path will consist of one or more optical fibers only.

Usually, the transmission fiber length is estimated after finishing the fiber cable installation or by distance calculations based on a geographical map.

It is, however, also possible to measure the fiber length after having finished the fiber cable installation. Also, the fiber length may be measured, if necessary, after the optical network installation has been finished or the structure thereof has been changed. Measurement of the length of an optical path is usually carried out by using appropriate measurement equipment, which, in most cases, uses a method based on optical pulse delay measurement. Such a measurement device, for example an optical time domain reflectometer (OTDR), is typically not integrated into a signal transmission equipment due to additional effort and costs related therewith.

Other measurement methods require a sophisticated transmission protocol that is used for the signal transmission between the two end points of the respective transmission link. In many cases, such measurement methods require synchronized clocks on both ends of the transmission link as the propagation delay of pulses is recorded.

Signal latency measurements are also implemented in transmission protocol standards like the ITU-T standard, which defines an optical transport network (OTN) as a set of optical network elements (ONE) connected by optical fiber links.

It is thus an object of the present invention to provide a method for determining the latency or length of an optical path, especially an optical fiber, of a fiber-optical transmission link, which can be implemented easily and at low costs and which does not require synchronized clocks at both ends of the transmission link. It is a further object of the invention to provide a device realizing the method according to the invention and an optical transmission link comprising such a device. Finally, it is an object of the invention to provide a method for routing signals in an optical network and a network implementing this method, wherein a given constraint for a maximum latency of a selected route between two network nodes is fulfilled.

SUMMARY OF THE INVENTION

The invention starts from the finding that a method for determining the latency of an optical path, i.e. the latency or delay time introduced by an optical path when transmitting an optical signal over the optical path, or length of an optical path can be advantageously be implemented by using a bidirectional optical supervisory channel between a first and a second end of an optical path, which may either be available anyway or which is newly established, and determining the round-trip delay by transmitting, within the optical supervisory channel, measurement bits or bit patterns forth and back between a first and second end of the optical path. The round-trip delay may be determined by carrying out a number of N of round trips, i.e by N times transmitting forth and back respective measurement bits or measurement bit patterns (which might be identical or different from each other for each transmission over the fiber-optic transmission link), and determining the time difference between sending the first measurement bit or bit pattern to the second (remote) end and receiving the last measurement bit or bit pattern at the first (near) end. This time difference is used to determine the total round-trip delay of the optical path, i.e. the delay of the measurement bit or measurement bit pattern due to the propagation along the optical path in the direction to and from the remote end. As far as possible, other contributions to the time difference measured, especially the delay caused by the signal processing at the far end, should be compensated, for example by subtracting a known or estimated delay time caused at the far end that comprises any delay between the conversion of the optical signal received (comprising the respective measurement bit or bit pattern) into a corresponding electrical signal and converting an electrical signal (comprising a respective measurement bit or bit pattern) into a corresponding optical signal which is re-transmitted to the near end. Thus, according to the invention, the total round-trip delay of the optical path is determined by evaluating time information available at the first (near) end.

Once the total round-trip delay of the optical path has been determined, the length of the optical path may be calculated by using the total round-trip delay and the group velocity $v_g$ which characterizes the signal propagation speed along the optical path.

According to an embodiment of the invention, the measurement bit patterns, especially the measurement bit pattern which is first sent to the remote node, may consist of or comprise a "SENT" time stamp comprising information concerning the first point in time at which the measurement bit pattern has been supplied to the first end of the optical path. Thus, this "SENT" time stamp or the whole measurement bit pattern may be copied to create a further bit pattern to be sent to the respective other end of the optical path. When having received the last measurement bit pattern after having carried out the last round trip of the number of N round trips, the "SENT" time stamp may be used to determine the total round-trip delay.

Of course, instead of using such a "SENT" time stamp, a single bit may be used for measuring the round-trip delay. However, in this case, a single bit must be recognized at the far end as a signal that a round-trip delay measurement is carried out so that a respective further measurement bit (or measurement bit pattern) is re-sent to the respective other end. In this case, the first point in time at which the measurement is started, must be stored at the near and.

As already mentioned above, the measurement bit or bit pattern to be sent from the respective first or second end to the respective other end may be a copy of the measurement bit or bit pattern that has been received. In this way, the signal processing necessary at the respective end of the optical path is reduced to a minimum, which, in turn, keeps the time delay due to signal processing low. At best, the time delay due to signal processing at the far end may then be neglected when determining the total round-trip delay.

However, as already mentioned above, in an embodiment of the invention, the time information used for determining, at the first end, the total round-trip delay, may comprise information concerning the time delay between receiving the measurement bit or bit pattern at the first and/or second end and re-transmitting the measurement bit or bit pattern to the respective other end.

Of course, the time delay may be measured at the respective first and/or second end and transmitted to the respective other end. If only a single round trip is carried out, measuring the time delay at the second (remote) end is sufficient. However, if more than one round trips are carried out, the time delay may be measured at the far end and the near and. The total round-trip delay may then be determined by subtracting all the time delays measured at the first and/or second ends from the total delay between starting the number of round trips when sending the first measurement bit or bit pattern and stopping the number of round trips when receiving the last measurement bit or bit pattern.

If the time delay between receiving a measurement bit or bit pattern and re-sending a measurement bit or bit pattern is known and constant for one end only, it is of course sufficient to measure the time delay at the respective other end.

It shall be mentioned at this point that it would also be possible to carry out only a single round trip in order to determine the latency or length of the optical path and to carry out a number of N such measurements in order to calculate an average value for the latency or length of the optical path instead of calculating an average total round-trip delay and using the group velocity $v_g$ to calculate the length of the optical path using the average total round-trip delay.

According to a further embodiment, the value measured for the time delay between receiving a measurement bit or bit pattern and re-sending a respective response may be integrated into the measurement bit pattern that is used for the response. Of course, the measurement or bit pattern received can be fully copied and the value measured or a respective information may be added thereto.

Alternatively, the value measured may be separately transmitted to the respective other end at a later time in the optical supervisory channel.

According to an embodiment of the invention, a frame-based transmission protocol can be used for the bidirectional optical supervisory channel, for example an Ethernet protocol. In such embodiments, a single measurement bit may be realized by using a dedicated bit within the structure of a frame. Likewise, a measurement bit pattern may be realized by using a dedicated portion within the structure of a frame. Time information measured at one end of the optical path may be transmitted to the respective other end also by using specific dedicated portions of a frame.

According to another embodiment of the invention, the measurement bits or bit patterns are transmitted during a respective inter-frame gap, i.e. during an idle period separating frames, for example Ethernet frames, Also time information, especially the value of a delay time measured at an end of the optical path (especially at the far end), may be transmitted during the inter-frame gap together with a respective measurement bit or bit pattern. However, it is also possible to transmit this type of information using the regular protocol of the optical supervisory channel, i.e. integrating this information in one or more frames.

According to a further embodiment, it is assumed that delays caused by the signal processing at the first and/or second end of the optical path, especially if a frame-based optical supervisory channel is used, add statistically. Thus, the lowest value determined for the total round-trip time of the optical path of a plurality of measurements carried out may be used to determine the round-trip delay. Of course, if a plurality of measurements is carried out completely (i.e. a value for the length of the optical path is determined in each measurement), the lowest value determined for the length of the optical path can be taken as the "true" value, i.e. as the final result of the measurement.

It shall be mentioned at this point that the optical path, the latency or length of which is to be determined, may consist of more than one single optical span, e.g. the span between to (passive) optical nodes. It may comprise a plurality of spans and also any arbitrary number of passive optical elements like optical splitters/combiners, optical circulators, passive optical add-/drop multiplexers, optical filters, optical directional couplers, optical circulators etc. However, no optical-electrical and electrical-optical conversion shall be effected within the optical path which is to be assessed.

As explained below, the length of the optical path may be used in order to control a dispersion compensation component, which is provided within the optical path, especially at the near and/or far end of the optical path, in such a way that the dispersion that is caused by the optical path is at least partially compensated.

This compensation may be effected manually by using the value of the latency or fiber length determined by the method or device according to the invention. Instead of directly using the latency or length value, a dispersion compensation value may be determined by using parameters of the optical path, e.g. a value of the dispersion of an optical fiber (given in ps/nm/km) realizing a respective optical path. Of course, an automatic compensation is also possible by supplying the respective value to one or more dispersion compensation devices.

It is also possible to use the latency in order to carry out a routing method that takes into account given latency constraints. For this purpose, the latencies of all optical paths (between every pair of two neighboring nodes at which an optical-electrical and electrical-optical conversion is effected) can be determined by applying the method or using the device according to the invention. The latency values may be supplied to a routing controller which is configured to determine a route between two of the nodes of the network the (total) latency of which is lower than a predetermined value in order to enable the transmission of time critical signals between the respective nodes. The latencies determined may be transmitted to the routing controller by using a control channel, e.g. an embedded control channel.

A device for determining the latency or length of an optical path according to the invention comprises a first optical transceiver at a first end of the optical path and a second optical transceiver at a second end of the optical path, the first and second optical transceivers being configured to establish a bidirectional optical supervisory channel between the first and a second end of the optical path, and a control device provided at the first and second end of the optical path. The control unit is configured to appropriately control the optical transceivers and to carry out the method according to the invention as explained above.

The control device may comprise or receive a time information of a first clock unit provided at the first end of the optical path and a second clock unit provided at the second end of the optical path, wherein, preferably, the clock units are not synchronized.

An optical transmission link according to the invention comprises a first and a second node connected by an optical path, wherein the nodes are configured to establish a bidirectional optical data communication link comprising at least one optical communication channel at a dedicated data channel wavelength and a bidirectional optical supervisory channel at a dedicated supervisory channel wavelength differing from the data channel wavelengths. Each of the nodes may comprise an add/drop filter provided right at the first and second end of the optical path or sufficiently close thereto, respectively. The nodes may further comprise a device for determining the length of an optical path according to the invention as explained above. Each of the optical add/drop filters has a supervisory channel port which is connected to the respective first or second optical transceiver, the first and second optical transceiver being configured to establish the optical supervisory channel only.

BRIEF DESCRIPTION OF THE DRAWINGS

Further objects and advantages of the present invention will become apparent from the following description of the preferred embodiments that are given by way of example with reference to the accompanying drawings, wherein.

DESCRIPTION OF THE INVENTION

Figure 1:
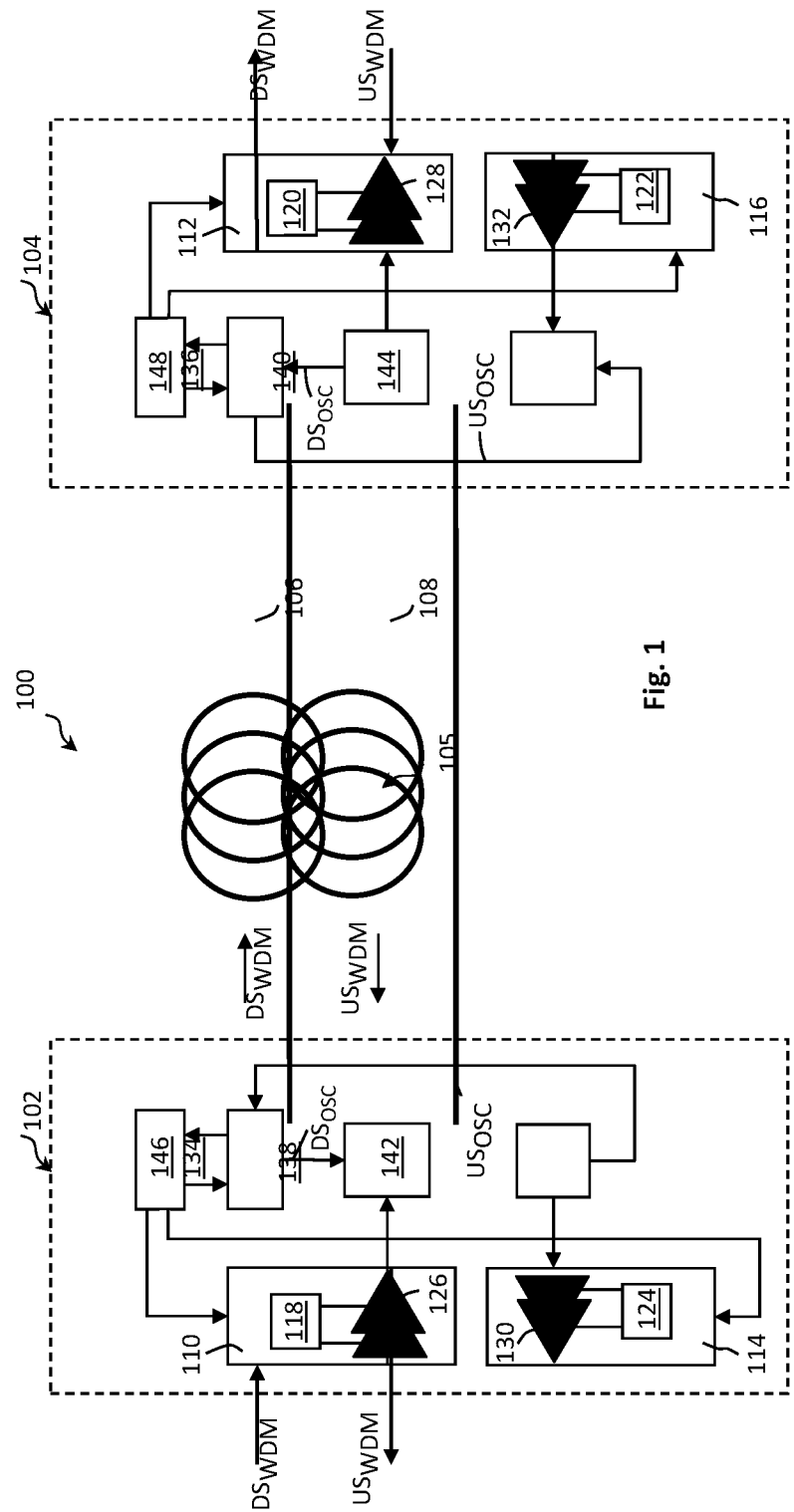
FIG. 1 shows a schematic block diagram of an optical transmission link according to the present invention comprising a device for determining the length of an optical path.

FIG. 1 shows an optical transmission link 100 comprising a first node 102 and a second node 104. The optical nodes are connected via an optical path 105 comprising an optical fiber 106 for the downstream transmission and a further optical fiber 108 for the upstream transmission of optical signals between the nodes 102, 104. In the following, the downstream direction of the bidirectional communication between the nodes 102, 104 is defined as the transmission direction from the first node 102 to the second node 104 and the upstream direction is defined as the transmission direction from the second node 104 to the first node 102.

Of course, the invention is not restricted to optical transmission links comprising an optical path which consists of separate optical fibers for the downstream and upstream transmission direction (so-called dual fiber working) but may also be applied to optical transmission links comprising an optical path which consists of a single optical fiber that is used for the downstream as well as for the upstream direction (so-called single-fiber working). In the latter case, each of the optical nodes 102, 104 comprises means for combining and separating the optical paths of the optical signal to be transmitted and the optical signal to be received.

In the following, the term "optical path" is used for both alternatives. That is, an optical path may comprise separate optical paths, for example separate optical fibers, for the downstream and upstream direction or a single optical path, for example an optical fiber, for both transmission directions.

In the embodiment shown in FIG. 1, the nodes 102, 104 are active optical nodes. The first node 102 is configured to receive, from a neighboring node (not shown in FIG. 1), a downstream optical WDM signal $DS_{WDM}$, to apply dispersion compensation to this signal and to transmit the dispersion-compensated signal to the second node 104. The second node 104 is configured to receive this signal $DS_{WDM}$, to apply a further dispersion compensation to the signal and to transmit this signal to a further neighboring node (not shown in FIG. 1). Likewise, the second node 104 is configured to receive, from the further neighboring node, an upstream optical WDM signal $US_{WDM}$, to apply a dispersion compensation to this signal and to transmit the dispersion-compensated signal to the first node 102. The first node 102 is configured to receive the signal $US_{WDM}$, to apply further dispersion compensation to this signal and to transmit this signal to the neighboring node. For reasons of simplicity, the optical downstream and upstream WDM signals are designated using identical reference signs irrespective of whether an optical dispersion compensation has been applied to the signal or the signal has passed through any passive optical component, including the optical path.

In the embodiment of an optical transmission link according to FIG. 1, the dispersion of the optical path, especially the chromatic dispersion, is compensated by using post- and pre-compensation. That is, a first portion of the dispersion caused by the optical path is compensated at the first node 102 and a second (remaining) portion of the dispersion is compensated at the second node 104. As dispersion compensation components in most cases cause an unacceptable additional attenuation, the respective optical signal is usually optically amplified in order to compensate the additional attenuation.

Therefore, known dispersion compensation components generally consist of a dispersion compensation component and means for optically amplifying the respective optical signal. As shown in FIG. 1, each node 102, 104 comprises a first dispersion compensation device 110, 112 provided in the optical path of the downstream optical WDM signal $DS_{WDM}$ and a second dispersion compensation device 114, 116 provided in the optical path of the upstream optical WDM signal $US_{WDM}$. As explained above, the dispersion compensation devices 110, 112 are configured to compensate the dispersion of the optical path 105, i.e. the optical fiber 106, in the downstream direction and the dispersion compensation devices 114, 116 are configured to compensate the dispersion of the optical path 105, i.e. the optical fiber 108, in the upstream direction.

If the optical transmission link 100 is connected to further transmission links in the upstream and downstream direction, the dispersion of the respective paths may be additionally compensated, wherein the dispersion compensation devices 110, 112; 114, 116 may be configured to additionally compensate a respective portion of the dispersion caused by the respective neighboring optical path.

The dispersion compensation devices 110, 112; 114, 116 shown in FIG. 1 comprise a dispersion compensation component 118, 120; 122, 124 that is connected to a dual stage optical amplifier 126, 128; 130, 132, e.g. a dual stage Erbium doped fiber amplifier (EDFA). That is, the respective downstream or upstream optical WDM signal $DS_{WDM}$, $US_{WDM}$ is optically amplified at a first stage of the dual stage optical amplifier 126, 128, 130, 132 and then supplied to an input port of the dispersion compensation component 118, 120; 122, 124. The dispersion compensated signal $DS_{WDM}$, $US_{WDM}$ is output at an output port of the dispersion compensation component 118, 120; 122, 124 and then optically amplified by the second stage of the dual stage optical amplifier 126, 128; 130, 132.

Each optical node 102, 104 further comprises an optical transceiver 134, 136. The optical transceiver 134 in the first node 102 is configured to create and transmit a downstream optical supervisory channel (OSC) signal $DS_{OSC}$ and to receive an upstream OSC signal $US_{OSC}$. The second node 104 is configured to create and transmit the upstream OSC signal $US_{OSC}$ and to receive the downstream OSC signal $DS_{OSC}$. The downstream and upstream OSC signals $DS_{OSC}$, $US_{OSC}$ are transmitted to the respective other node via the optical path 105 as part of the respective downstream and upstream optical WDM signal $DS_{WDM}$, $US_{WDM}$.

An optical add filter 138 is comprised by the node 102 in order to combine the downstream OSC signal $DS_{OSC}$ with the downstream optical WDM signal $US_{WDM}$. A WDM input port of the add filter 138 is connected to the output port of the dispersion compensation device 110, which corresponds to the output port of the dual stage optical amplifier 126. An optical transmit port of the optical transceiver 134, at which the downstream OSC signal $DS_{OSC}$ is output, is connected to a channel port of the optical add filter 138. A WDM output port of the add filter 138 is connected to or defines an eastern output port of the node 102, which is connected to the optical fiber 106.

The node 104 comprises an optical drop filter 140 for extracting the downstream OSC signal $DS_{OSC}$ from the downstream optical WDM signal $DS_{WDM}$. A WDM input port of the optical drop filter 140 is connected to or defines a western input port of the node 104, which is connected to the optical fiber 106. A WDM output port of the drop filter 140 is connected to the input port of the dispersion compensation device 112 or the input port of the dual stage optical amplifier 128, respectively. A channel output port of the drop filter 140 is connected to an optical receive port of the optical transceiver 136.

A transmit output port of the optical transceiver 136 is connected to a channel input port of an optical add filter 144, which is configured to combine the upstream OSC signal with the upstream optical WDM signal $US_{WDM}$. A WDM input port of the optical add filter 144 is connected to an output port of the dispersion compensation device 116 or the output port of the dual stage optical amplifier 132, respectively. A WDM output port of the optical add filter 144 is connected to or defines an eastern output port of the second node 104. An optical transmit port of the optical transceiver 136, at which the upstream OSC signal is output, is connected to a channel port of the optical add filter 144.

The node 102 comprises a further optical drop filter 142 having a WDM input port connected to or defining an eastern input port of the node 102 and a WDM output port connected to the input port of the dual stage optical amplifier 130 of the dispersion compensation device 114. A channel output port of the optical drop filter 142 is connected to an optical receive port of the optical transceiver 134.

The nodes 102, 104 further comprise a controller 146, 148, wherein the controllers 146, 148 form a control device for establishing a bidirectional communication via an OSC using the downstream and upstream OSC signals $DS_{OSC}$, $US_{OSC}$.

While the embodiment shown in FIG. 1 realizes an OSC which uses a dedicated wavelength that differs from the optical channels defined for the downstream and upstream optical WDM signals $DS_{WDM}$, $US_{WDM}$, the invention explained below in greater detail is not restricted to this type of OSCs. Rather, the OSC might also be realized as an embedded OSC by modulating either the whole WDM signals or a specific channel signal that is used for data communication, i.e. for transmitting wanted information.

In the following, various embodiments of a method for determining the latency and/or length of the optical path 105 will be explained with reference to FIGS. 2a-2b, FIGS. 3a-3b, and FIGS. 4a-4b, respectively. All these embodiments have in common that the OSC is used to transmit forth and back measurement bits or bit patterns between the nodes 102, 104 in order to determine the round-trip delay, or, as the case may be, to correct that round-trip delay and to calculate the length of the optical path 105 by multiplying half of the (corrected) round-trip delay by the group velocity $v_g$, i.e. the propagation speed of the optical signals along the optical path.

As in practice the round-trip delay measured in this way is not only determined by the propagation delay of the optical signals due their transmission through the optical paths but also by the delay due to electrical signal processing in the node(s) (electrical delay), which receive a measurement bit or measurement bit pattern and re-send a (responsive) bit or bit pattern to the respective other node, it is advantageous to estimate or measure the electrical delay and to take into account the electrical delay when calculating the effective round-trip delay, i.e. the project delay that is caused by the optical path only. This is also true for applications in which the latency is determined, only, instead of additionally determining the length of the optical path as the additional latency introduced by the signal processing in order to carry out the measurement method may be different from the latency caused by the same or different equipment for transmitting data over the optical transmission link (that includes the components of the two nodes at both ends of the optical path and the optical path itself).

The latency introduced by the optical path may then be supplied to a routing controller of a complex network, which comprises a plurality of nodes (of any kind) that are connected via optical paths in such a way that differing routes can be used in order to (unidirectionally or bidirectionally) connect two selected nodes. For example, the network nodes may be connected using a fully meshed structure. If the two selected nodes must be connected in such a way that the total latency (i.e. the latency of the optical paths and the latency caused by any type of signal processing in the nodes) must fulfill a given latency constraint, the network controller can select an appropriate route taking into account the single latencies introduced by the optical paths between the network nodes.

In such applications, all network nodes must be configured to carry out the method for determining the latency of the optical paths, i.e. each pair of network nodes provided at the ends of an optical path (which may consist of optical fibers or any other optical component) must be configured to determine the latency of the respective optical path.

Figure 2B:
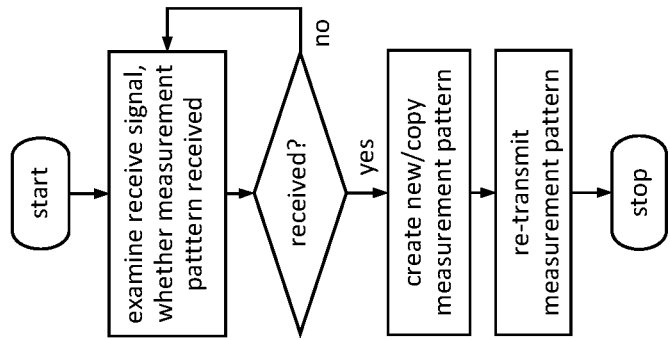
FIGS. 2a and 2b show flow diagrams explaining the steps of a first embodiment of the method for determining the optical path length which are to be carried out at the first end (FIG. 2a) and second end (FIG. 2b) of the optical path.
Figure 2A:
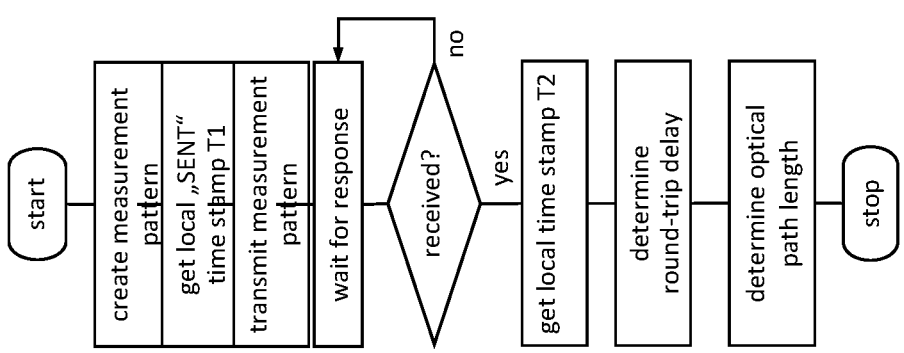

FIGS. 2a-2b show simplified flow diagrams explaining a first embodiment of the method for determining the length of the optical path 105 between the nodes 102, 104, wherein the flow diagram according to FIG. 2a comprises the steps of the method that are carried out at the node 102, at which the process of measuring the round-trip delay is started, and the flow diagram according to FIG. 2b comprises the steps of the method that are carried out at the (responding) node 104.

After the measurement process has been started, the controller 146 creates a measurement bit or pattern and controls the optical transceiver 134 in such a way that an optical downstream OSC signal $DS_{OSC}$ is created which includes the measurement bit or pattern.

In principle, any arbitrary communication protocol can be used for the OSC. For example, if the OSC is exclusively used for the method for determining the length of the optical path 105 (at least for the time required to carry out the method), a single measurement bit (i.e. a single impulse) may be used. However, as in practice the OSC is used for additional network management tasks, certain exclusive use for the measurement may be disadvantageous. Thus, the measurement bit or pattern may be integrated into the transmission protocol that is used for the communication over the OSC, e.g an Ethernet protocol or any other frame-based protocol. In such an embodiment, a dedicated bit or a dedicated bit pattern within a frame may be used as measurement bit or measurement bit pattern.

At the time at which the measurement bit or pattern is transmitted, the controller 146 receives or determines a local time stamp T1 and stores this time stamp as the start time of the measurement process. Instead, the controller 146 may use the time stamp T1 as a measurement bit pattern, which, for example, may be integrated in a respective data frame.

The node 104, i.e. the controller 148, may be configured to continuously scan the downstream OSC signal $DS_{OSC}$ in order to detect a measurement bit or measurement bit pattern which is comprised within the downstream OSC signal $DS_{OSC}$. Alternatively, the controller 146 may transmit a measurement preparation command to the controller 148 which switches the controller 148 into a measurement mode. This may be advantageous if the OSC is exclusively reserved for the measurement during the whole measurement process.

Whenever the node 104 or the controller 148, respectively, detects a measurement bit or measurement bit pattern, the controller 148 immediately responds by creating and re-sending another measurement bit or bit pattern to the node 104. Of course, the structure of the measurement bit or bit pattern that is re-sent to the node 104 may be identical with the structure of the measurement bit or bit pattern received. As in case of the measurement bit or bit pattern that is sent in the downstream direction, the measurement bit or bit pattern that is re-sent to the node 102 may be integrated in a respective data frame or sent as an independent signal within the upstream OSC signal $US_{OSC}$.

As apparent from FIG. 2a, the controller 146 waits for a valid response upon having sent the measurement bit or bit pattern to the node 104. The controller receives or determines a further local time stamp T2 when a valid response is detected in the upstream OSC signal $US_{OSC}$. Of course, if the local time stamp T1 is used as a measurement bit pattern in the downstream direction, the controller 148 in the node 104 may copy this measurement bit pattern in order to create the measurement bit pattern that is used in the upstream direction. In this case, the controller 146 may read the measurement bit pattern received, i.e. the local time stamp T1, instead of storing the local time stamp T1 as explained above.

In a next step, the controller 146 determines the round-trip delay RTD as the time difference T2−T1 (i.e. RTD=T2−T1). As, in the embodiment according to FIGS. 2a-2b, the controller 148 immediately responds to the measurement bit or bit pattern received by re-sending a measurement bit or bit pattern without or with an insignificant delay, the round-trip delay measured in this way essentially corresponds to the mere optical delay caused by the finite propagation speed of the optical signal along the optical path 105.

It is also possible to correct the round-trip delay RTD if the controller 148 requires a known time interval in order to process the signal received and to create and re-send the responsive measurement bit or bit pattern. This electrical delay may be known to the controller 146 for known types of controllers 148 or a known structure of the node 104, respectively. In this case, the round-trip delay RTD may be corrected by subtracting a known electrical delay $\Delta T_{el}$, i.e. the corrected round-trip delay $RTD_{cor}=RTD-\Delta T_{el}$ (i.e. $RTD_{corr}=T2-T1-T_{el}$). The latency may then be determined as half of the (as the case may be) corrected round-trip time RTD (or $RTD_{cor}$).

In a next final step, the controller 146 may determine the optical path length $\Delta L$ by multiplying half of the (as the case may be, corrected) round-trip time RTD (or $RTD_{cor}$) by the group velocity of the optical signal, i.e. $\Delta L=0.5 \cdot RTD_{cor} \cdot v_g$.

As explained above, the optical path length $\Delta L$ may then be used in order to determine the amount of dispersion compensation required and to appropriately control the dispersion compensation devices 110, 112, 114, 116. Of course, in the embodiment shown in FIG. 1, the information concerning the path length $\Delta L$ or the amount of dispersion compensation required at the node 104 can be transmitted from the node 102 to the node 104 within the downstream OSC.

Figure 3B:
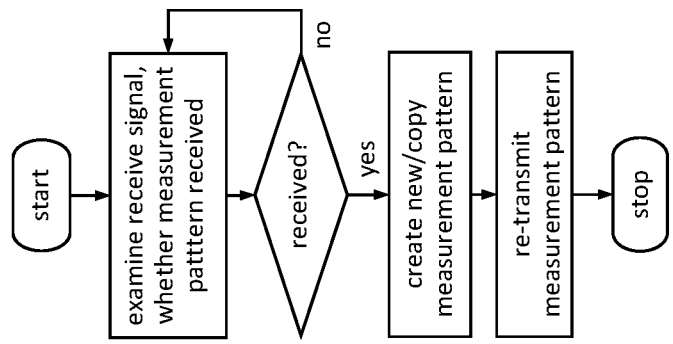
FIGS. 3a and 3b show flow diagrams explaining the steps of a second embodiment of the method for determining the optical path length which are to be carried out at the first end (FIG. 3a) and second end (FIG. 3b) of the optical path.
Figure 3A:
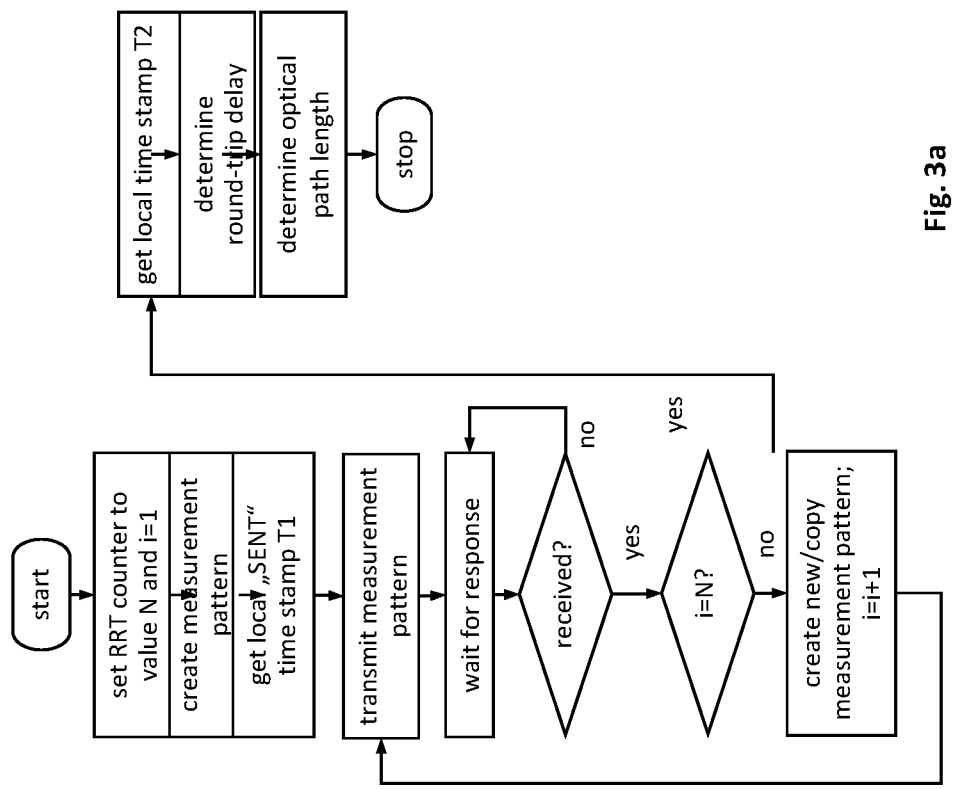

The simplified flow diagrams shown in FIGS. 3a-3b relate to an alternative method which, however, corresponds to the method according to FIGS. 2a-2b in large parts. Especially, the steps to be carried out at node 104 are identical.

As apparent from FIG. 3a, this method differs from the method according to FIG. 2a insofar as more than one round-trip transmission carried out, wherein each round-trip transmission comprises the transmission of a downstream measurement bit or bit pattern within the downstream OSC signal $DS_{OSC}$ from node 102 to node 104 and the transmission an upstream measurement bit or bit pattern within the upstream OSC signal $US_{OSC}$ from node 104 to node 102. If the controller 146 detects a response, i.e. a measurement bit or bit pattern in the upstream OSC signal $US_{osc}$ and recognizes that a further round trip must be carried out, it immediately re-sends a further measurement bit or bit pattern to node 104 in the downstream OSC signal $DS_{OSC}$.

Of course, a respective known electrical delay due to the signal processing in node 102 (especially in the controller 146) may be used to correct the round-trip delay (see below).

Further, also in this embodiment, the downstream measurement bit or bit pattern may be identical with the upstream measurement bit or bit pattern as far as the respective structure is concerned.

As apparent from FIG. 3a, the controller 146 receives or determines the local time stamp T2 simultaneously or shortly after the last responsive measurement bit or bit pattern has been received within the upstream OSC signal $US_{OSC}$.

The higher number of round trips results in an increased measurement time T2−T1 so that the average round-trip delay, which corresponds to (T2−1)/N (where N is the number of round trips), can be determined with higher accuracy in case the local clock used for creating the time stamps T1, T2 has a rather low resolution. Further, in embodiments in which the electrical delay at the node 104 is compensated by using a known average value for the electrical delay, averaging may also be advantageous as the measured average electrical delay comes closer to the estimated or known (average) electrical delay $\Delta T_{el}$. In case of more than one round trip, the electrical delay $\Delta T_{el}$ is influenced by the delay caused in node 102 and the delay caused in node 104.

Figure 4B:
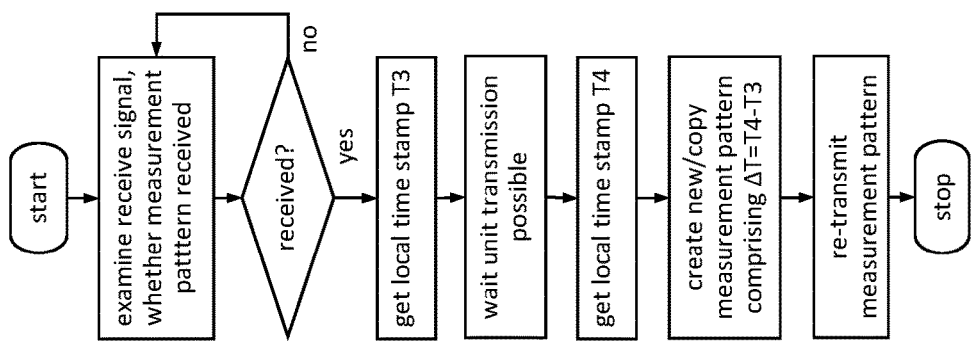
FIGS. 4a and 4b show flow diagrams explaining the steps of a third embodiment of the method for determining the optical path length which are to be carried out at the first end (FIG. 4a) and second end (FIG. 4b) of the optical path.
Figure 4A:
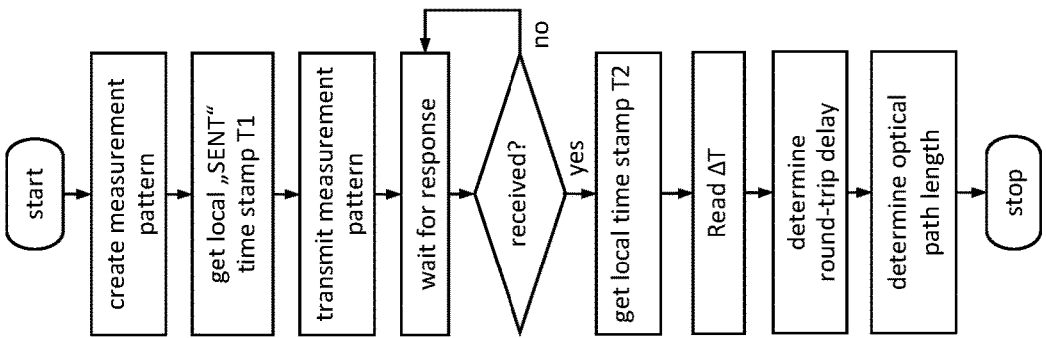

The further alternative method for determining the latency and/or length of the optical path 105 shown in the simplified flow diagram according to FIG. 4a differs from the matters explained above in that the electrical delay caused by the signal processing in node 104 (essentially caused by the controller 148) is not only estimated but actually measured. For the remainder, the method according to FIGS. 4a-4b corresponds to the method according to FIGS. 2a-2b. Thus, in the following, only the differing parts will be explained.

As apparent from FIG. 4b, which shows the steps that are carried out at the node 104 (i.e. by the controller 148), a local time stamp T3 is determined immediately after having received a downstream measurement bit or bit pattern in the downstream OSC signal $DS_{OSC}$.

In a next step, the controller 148 waits until an appropriate response can be re-sent to node 102 in the upstream OSC signal $US_{OSC}$. This makes it possible to take into account a higher priority of other communication tasks in the OSC. If the controller 148 detects that it is possible to create and integrate a response into the upstream OSC signal $US_{OSC}$, it receives or determines a local time stamp T4 and creates a new measurement pattern. This measurement pattern may comprise the local time stamps T3 and T4 or a respective value for the time difference T4 −T3, which corresponds to the electrical delay $\Delta T_{el}$.

This measurement pattern is then re-transmitted in the upstream OSC signal $US_{OSC}$ 102 and detected by the controller 146. In this method, the controller 146 determines the round-trip delay RTD (which in this embodiment is a corrected $RTD_{cor}$), after having detected the measurement bit pattern and after having read the time stamps T3 and T4 or the electrical delay $\Delta T_{el}$, according to the equation $RTD_{cor}=T2-T1-(T4-T3)$ or $RTD_{cor}=T2-T1-\Delta T_{el}$, respectively. The latency and/or length of the optical path is calculated in a last step as explained above.

This embodiment for measuring the length of the optical path 105 may also be varied by using more than a single round trip. In this alternative, the controller 146 may determine the delay between receiving a measurement bit or bit pattern in the upstream direction and transmitting a further (responsive) measurement bit or bit pattern in the downstream direction. This further electrical delay may be subtracted from the measured total round-trip delay in order to determine the corrected round-trip delay $RTD_{cor}$.

The measurement principle underlying the embodiment according to FIGS. 4a-4b may also be used if the measurement patterns are not transmitted in frames even if a frame-based communication protocol is used for the OSC. One appropriate alternative is to eliminate other frames during the whole time required for carrying out the measurement. Another alternative is to use inter-frame gaps, i.e. minimum idle periods separating the frames which are provided by certain frame-based communication protocols, such as the various embodiments of the Ethernet protocol. In this way, the normal communication over the OSC is not influenced by the measurement method.

If inter-frame gaps are used, the controller 146 may transmit a measurement bit or bit pattern in an appropriate inter-frame gap. As mentioned above, the measurement bit or bit pattern may be a single bit (i.e. a single impulse) or a more complex bit pattern, which may also comprise a time stamp, for example the time stamp T1.

The controller 148 in node 104 is, in this alternative, configured to detect the measurement bit or bit pattern during an inter-frame gap and to re-send a responsive measurement bit or bit pattern in an inter-frame gap in the upstream direction. It would also be possible to use a simple structure for the response that is sent during the inter-frame, e.g. a single bit or a short characteristic bit pattern only, and to send further information necessary for carrying out the whole measurement method in ordinary frames. For example, the time stamps T3 and T4 may be sent in ordinary frames whereas a responsive bit or bit pattern is re-sent to node 102 in an appropriate (earlier) inter-frame. However, as mentioned above, transmitting all data/measurement patterns necessary for the measurement during inter-frame gaps has the advantage that the measurement can be carried out during regular OSC communication without making any high demands on the ongoing traffic within the OSC.

As in practice in a real communication network various delays (especially electrical delays due to signal processing, switching etc.) add up statistically to a total delay, the optical delay caused by the optical path 105 can be determined, with higher accuracy, by carrying out multiple measurements of the round-trip delay and using the minimum value of the measured values $RTD_1$, $RTD_2$, ... $RTD_M$ (or, as the case may be, the values of the corrected round-trip delays $RTD_{cor,i}$, $1 \le i \le N$) as the correct value for the (corrected) round-trip delay. Of course, also each of the values $RTD_1$, $RTD_2$, ... $RTD_M$ (or each of the values $RTD_{cor,i}$, $1 \le i \le N$) may be determined by using a number N of round trips as explained in connection with the embodiments discussed above.

As apparent from the embodiments explained above, the clocks provided in the nodes 102, 104 (in the controllers 146, 148) need not be synchronized as only a time delay or time difference T4−T3 or $\Delta T_{el}$ is required in order to determine the corrected round-trip delay $RTD_{cor}$. In the simplest embodiment, according to which the node 104 just re-sends a measurement bit or bit pattern as fast as possible to the node 102, no clock is required at all. The method can simply be carried out if an OSC exists. As the add and drop filters 138, 140, 142, 144 of an OSC are usually provided close to the optical input/output ports of a network node, the round trip delay corresponds to the optical path length with high accuracy, especially if electrical delays are corrected.

If the optical path 105 consists of a single path, e.g. a single optical fiber, that is used for both the downstream and the upstream communication and OSC signals, a single optical add/drop filter (not shown in FIG. 1) may be used instead of separate add and drop filters.

As mentioned above, the method and devices for determining the latency of an optical path between two nodes, e.g. to network nodes, may also be used in order to implement a latency constraint routing method in an optical transmission network.

Figure 5:
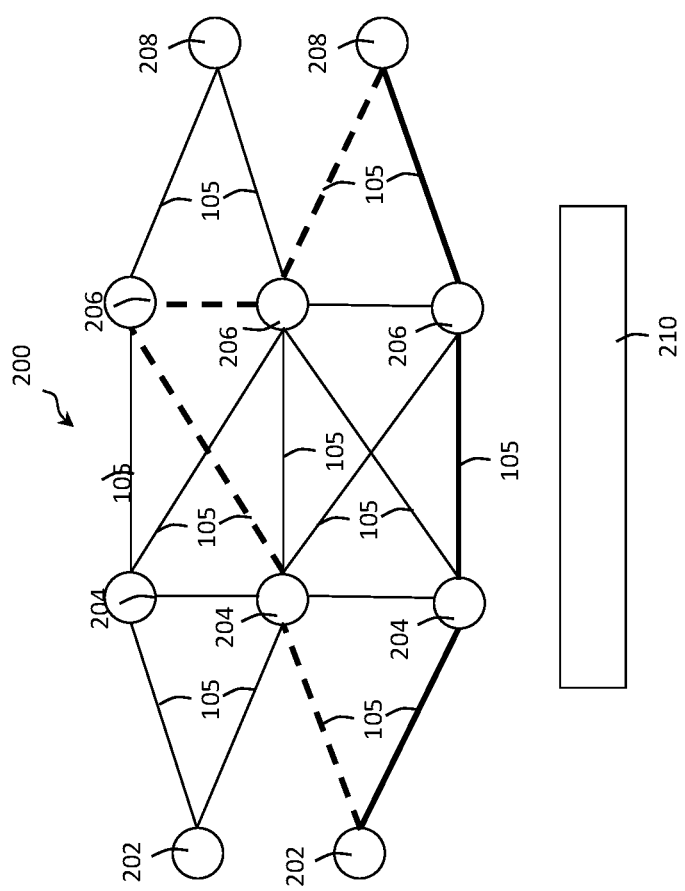
FIG. 5 shows a schematic representation of an optical transmission network.

As shown in FIG. 5, an optical transmission network 200 may comprise a plurality of network nodes 202, 204, 206 and 208, which are connected by means of optical paths 105. The optical transmission network shown in FIG. 5 does not reveal a fully meshed structure. For example, the nodes 202 are connected to two neighboring network nodes 204, wherein the upper network node 202 is connected to the two upper network nodes 204 and the lower network node 202 is connected to the two lower network nodes 204.

The optical transmission network 200 comprises a routing controller 210, which is configured to control the network nodes 202 to 208 in such a way that an incoming optical transmission signal is routed to a predetermined neighboring network node. In order to simplify the representation of the optical transmission network 200 in FIG. 5, the connections between the routing controller 210 and the network nodes 202 to 208 are omitted.

Each of the network nodes 202 to 208 is configured to determine the latency of the optical path that connects the network node to a neighboring network node. For example, each pair of network nodes 202 and the optical path between these network nodes may form an optical transmission link 100 as described with reference to FIG. 1. Each pair of neighboring network nodes 202 to 28 is therefore able to determine the latency of the optical path 105 that connects this pair of network nodes as described above.

The latencies determined by the network nodes 202 to 208 are supplied to the network controller. This may, for example, be effected by means of a control channel, for example an embedded control channel, that is established between the network nodes and the routing controller 210.

Of course, the routing controller 210 may be comprised by one of the network nodes 202 to 208.

The routing controller 210 may then use the latencies in order to determine an appropriate route between two selected network nodes. FIG. 5 shows, represented by the thicker lines indicating the optical paths 105, a route between the lower network node 202, the lowest network node 204, the lowest network node 206 and the lower network node 208. A possible second route between the same two network nodes 202 and 208 is shown by thicker dashed lines. This second route comprises the middle network node 204, the upper network node 206 and the middle network node 206.

Obviously, the second route is longer than the first route and thus the total latency of the second route is higher than the total latency of the first route.

If the total latency is critical to the signal transmission between the respective network nodes 202 and 208, the first route might be acceptable and the second route might be unacceptable.

Thus, for critical applications or transmissions between two selected network nodes, the network controller may use the latencies of the single optical paths 105 between two neighboring network nodes 202 to 208 in order to determine the route between two selected notes in such a way that the total latency is below a given threshold value, i.e. a maximum value that is acceptable for the respective application or signal transmission.

LIST OF REFERENCE SIGNS 100 optical transmission link
102 first node
104 second node
105 optical path
106 optical fiber
108 optical fiber
110 dispersion compensation device
112 dispersion compensation device
114 dispersion compensation device
116 dispersion compensation device
118 dispersion compensation component
120 dispersion compensation component
122 dispersion compensation component
124 dispersion compensation component
128 optical amplifier
130 optical amplifier
132 optical amplifier
134 optical transceiver
136 optical transceiver
138 optical add filter
140 optical drop filter
142 optical drop filter
144 optical add filter
146 controller
148 controller
200 optical transmission network
202 network node
204 network node
206 network node
208 network node
$DS_{WDM}$ downstream optical WDM signal
$US_{WDM}$ upstream optical WDM signal
$DS_{OSC}$ downstream OSC signal
$US_{OSC}$ upstream OSC signal
$RTD_i$ round-trip delay
$RTD_{cor,i}$ corrected round-trip delay
$\Delta L$ optical path length
$\Delta T_{el}$ electrical delay

The invention claimed is:

1. A method for determining the latency or length of an optical path of a fiber-optic transmission link, comprising:
   (a) starting a measurement cycle at a first point in time, wherein, for carrying out the measurement, measurement bits or bit patterns are transmitted forth and back within an optical supervisory channel between a first and second end of the optical path, beginning at the first end at the first point in time, for a predetermined number of round trips;
   (b) stopping the measurement cycle at a second point in time after having received a last measurement bit or bit pattern at the first end;
   (c) determining, at the first end, a total round-trip delay of the optical path by evaluating a time information available at the first end, wherein the time information at least comprises the first and second points in time, and taking into account the predetermined number of round-trips; and
   (d) calculating the latency of the optical path by using the total round-trip delay and/or calculating the length of the optical path by using the total round-trip delay and group velocity characterizing signal propagation along the optical path, wherein a frame-based transmission protocol is used for the bidirectional optical supervisory channel and wherein the measurement bits or bit patterns are transmitted during a respective inter-frame gap.

2. The method according to claim 1, wherein the measurement bit patterns comprise a "SENT" time stamp comprising information concerning the first point in time at which the measurement bit pattern has been supplied to the first end of the optical path.

3. The method according to claim 1, wherein the measurement bit or bit pattern to be sent from the respective first or second end to the respective other end is a copy of the measurement bit or bit pattern that has been received.

4. The method according to claim 1, wherein the time information further comprises information concerning a time delay between receiving the measurement bit or bit pattern at the first and/or second end and re-transmitting the measurement bit or bit pattern to the respective other end and that the time delay is taken into account for determining the total round-trip delay.

5. The method according to claim 4, wherein the time delay is measured at the respective first and/or second end and that the value measured is transmitted to the respective other end.

6. The method according to claim 5, wherein the value measured is integrated into the measurement bit pattern.

7. The method according to claim 5, wherein the value measured is separately transmitted to the respective other end.

8. A method for routing signals in an optical network comprising a plurality of network nodes which are connected by optical paths in such a way that two or more signal transmission routes using different combinations of optical paths can be used in order to establish a unidirectional or bidirectional communication between a selected pair of network nodes,
  (a) wherein latency of optical paths between the network nodes is determined according to the method of claim 1 and
  (b) wherein the route for connecting the selected pair of network nodes is determined in such a way that the sum of the latencies of the optical paths comprised by the route does not exceed a predetermined threshold value.

9. An optical transmission network comprising
  (a) a plurality of network nodes which are connected by optical paths in such a way that two or more signal transmission routes using different combinations of optical paths can be used in order to establish a unidirectional or bidirectional communication between a selected pair of network nodes and
  (b) a routing controller which is configured determine an appropriate signal transmission route between the selected pair of network nodes and to control the network nodes in such a way that the signal transmission route determined is established between the selected pair of network nodes,
  (c) wherein the network nodes are configured to determine latencies of the optical paths between two neighboring network nodes according to the method of claim 1,
  (d) wherein the network nodes are configured to supply the latencies of the optical paths to the routing controller, and
  (e) wherein the routing controller is configured to determine the route for connecting the selected pair of network nodes in such a way that the sum of the latencies of the optical paths comprised by the route does not exceed a predetermined threshold value.

10. The method according to claim 1, wherein the frame-based transmission protocol is an Ethernet protocol.

11. A method for determining the latency or length of an optical path of a fiber-optic transmission link, comprising:
  (a) starting a measurement cycle at a first point in time, wherein, for carrying out the measurement, measurement bits or bit patterns are transmitted forth and back within an optical supervisory channel between a first and second end of the optical path, beginning at the first end at the first point in time, for a predetermined number of round trips;
  (b) stopping the measurement cycle at a second point in time after having received a last measurement bit or bit pattern at the first end;
  (c) determining, at the first end, a total round-trip delay of the optical path by evaluating a time information available at the first end, wherein the time information at least comprises the first and second points in time, and taking into account the predetermined number of round-trips; and
  (d) calculating the latency of the optical path by using the total round-trip delay and/or calculating the length of the optical path by using the total round-trip delay and group velocity characterizing signal propagation along the optical path, wherein the round-trip delay is determined a plurality of times and that a lowest value is taken to determine the latency or length of the optical path.

12. A method for routing signals in an optical network comprising a plurality of network nodes which are connected by optical paths in such a way that two or more signal transmission routes using different combinations of optical paths can be used in order to establish a unidirectional or bidirectional communication between a selected pair of network nodes,
  (a) wherein latency of optical paths between the network nodes is determined according to the method of claim 11 and
  (b) wherein the route for connecting the selected pair of network nodes is determined in such a way that the sum of the latencies of the optical paths comprised by the route does not exceed a predetermined threshold value.

13. An optical transmission network comprising
  (a) a plurality of network nodes which are connected by optical paths in such a way that two or more signal transmission routes using different combinations of optical paths can be used in order to establish a unidirectional or bidirectional communication between a selected pair of network nodes and
  (b) a routing controller which is configured determine an appropriate signal transmission route between the selected pair of network nodes and to control the network nodes in such a way that the signal transmission route determined is established between the selected pair of network nodes,
  (c) wherein the network nodes are configured to determine latencies of the optical paths between two neighboring network nodes according to the method of claim 11,
  (d) wherein the network nodes are configured to supply the latencies of the optical paths to the routing controller, and
  (e) wherein the routing controller is configured to determine the route for connecting the selected pair of network nodes in such a way that the sum of the latencies of the optical paths comprised by the route does not exceed a predetermined threshold value.

14. A device for determining the latency or length of an optical path of a fiber-optic transmission link, comprising:
  (a) a first optical transceiver at a first end of the optical path and a second optical transceiver at a second end of the optical path, the first and second optical transceivers being configured to establish a bidirectional optical supervisory channel between the first and second end of the optical path; and (b) a control device provided at the first and second end of the optical path, wherein the control device is configured:
   (i) to start a measurement cycle at a first point in time,
   (ii) to control the first and second transceivers in such a way that measurement bits or bit patterns are created and transmitted forth and back between the first and second ends within the optical supervisory channel between the first and second ends, beginning at the first end at the first point in time, for a predetermined number of round-trips, wherein a frame-based transmission protocol is used for the bidirectional optical supervisory channel and wherein the measurement bits or bit patterns are transmitted during a respective inter-frame gap;
   (iii) to stop the measurement cycle at a second point in time after having received a last measurement bit or bit pattern at the first end;
   (iv) to determine, at the first end, a total round-trip delay of the optical path by evaluating a time information available at the first end, wherein the time information at least comprises the first and second points in time, and taking into account the predetermined number of round-trips; and
   (v) to calculate the latency of the optical path by using the total round-trip delay and/or to calculate the length of the optical path by using the round-trip delay and the group velocity characterizing signal transmission over the optical path.

15. The device according to claim 14, wherein the measurement bit patterns comprise a "SENT" time stamp comprising information concerning the first point in time at which the measurement bit pattern has been supplied to the first end of the optical path.

16. The device according to claim 14, wherein the control device comprises or receives time information of a first clock unit provided at the first end of the optical path and a second clock unit provided at the second end of the optical path.

17. The device according to claim 16, wherein the first clock unit and the second clock unit are not synchronized.

18. An optical transmission link comprising:
   (a) a first and a second node connected by an optical path,
   (b) the nodes being configured to establish a bidirectional optical data communication link comprising at least one optical communication channel at a dedicated data channel wavelength and a bidirectional optical supervisory channel at a dedicated supervisory channel wavelength differing from the data channel wavelengths,
   (c) each of the nodes comprising an add/drop filter means provided right at the first and second end of the optical path or sufficiently close thereto, respectively, the add/drop filter means being configured to integrate an optical supervisory channel signal into an optical WDM signal to be transmitted to the respective other node and to extract an optical supervisory channel signal from an optical WDM signal received from the respective other node, and
   (d) wherein the nodes further comprise a device for determining the latency or length of the optical path according to claim 14.

19. A device for determining the latency or length of an optical path of a fiber-optic transmission link, comprising:
   (a) a first optical transceiver at a first end of the optical path and a second optical transceiver at a second end of the optical path, the first and second optical transceivers being configured to establish a bidirectional optical supervisory channel between the first and second end of the optical path; and
   (b) a control device provided at the first and second end of the optical path, wherein the control device is configured:
      (i) to start a measurement cycle at a first point in time;
      (ii) to control the first and second transceivers in such a way that measurement bits or bit patterns are created and transmitted forth and back between the first and second ends within the optical supervisory channel between the first and second ends, beginning at the first end at the first point in time, for a predetermined number of round-trips;
      (iii) to stop the measurement cycle at a second point in time after having received a last measurement bit or bit pattern at the first end;
      (iv) to determine, at the first end, a total round-trip delay of the optical path by evaluating a time information available at the first end, wherein the time information at least comprises the first and second points in time, and taking into account the predetermined number of round-trips; and
      (v) to calculate the latency of the optical path by using the total round-trip delay and/or to calculate the length of the optical path by using the round-trip delay and the group velocity characterizing signal transmission over the optical path, wherein the round-trip delay is determined a plurality of times and that a lowest value is taken to determine the latency or length of the optical path.

20. An optical transmission link comprising
   (a) a first and a second node connected by an optical path,
   (b) the nodes being configured to establish a bidirectional optical data communication link comprising at least one optical communication channel at a dedicated data channel wavelength and a bidirectional optical supervisory channel at a dedicated supervisory channel wavelength differing from the data channel wavelengths,
   (c) each of the nodes comprising an add/drop filter means provided right at the first and second end of the optical path or sufficiently close thereto, respectively, the add/drop filter means being configured to integrate an optical supervisory channel signal into an optical WDM signal to be transmitted to the respective other node and to extract an optical supervisory channel signal from an optical WDM signal received from the respective other node, and
   (d) wherein the nodes further comprise a device for determining the latency or length of the optical path according to claim 19.

* * * * *